US012705516B2

(12) United States Patent
Tran et al.

(10) Patent No.: US 12,705,516 B2
(45) Date of Patent: Aug. 11, 2026

(54) SYSTEMS AND METHODS FOR OPTIMAL STATE TRANSFER AND ENTANGLEMENT GENERATION IN POWER-LAW INTERACTING SYSTEMS

(71) Applicants: University of Maryland, College Park, College Park, MD (US); The Regents of the University of Colorado, Denver, CO (US); Government of the United States of America as Represented by the Secretary of Commerce, Gaithersburg, MD (US)

(72) Inventors: Minh C. Tran, College Park, MD (US); Abhinav Deshpande, College Park, MD (US); Andrew Y. Guo, College Park, MD (US); Andrew Lucas, Boulder, CO (US); Alexey Gorshkov, Potomac, MD (US); Przemyslaw Bienias, College Park, MD (US); Jeremy T. Young, Gaithersburg, MD (US); Ron Belyansky, College Park, MD (US)

(73) Assignees: University of Maryland, College Park, MD (US); The Regents of the University of Colorado, a body corporate, Denver, CO (US); Government of the United States of America as Represented by the Secretary of Commerce, Gaithersburg, MD (US)

( * ) Notice: Subject to any disclaimer, the term of this patent is extended or adjusted under 35 U.S.C. 154(b) by 893 days.

(21) Appl. No.: 17/959,901

(22) Filed: Oct. 4, 2022

(65) Prior Publication Data

US 2023/0129562 A1 Apr. 27, 2023

Related U.S. Application Data

(60) Provisional application No. 63/262,085, filed on Oct. 4, 2021, provisional application No. 63/378,210, filed on Oct. 3, 2022.

(51) Int. Cl.
*G06N 10/40* (2022.01)
*G06N 10/00* (2022.01)
*G06N 10/20* (2022.01)

(52) U.S. Cl.
CPC ............. *G06N 10/20* (2022.01); *G06N 10/00* (2019.01); *G06N 10/40* (2022.01)

(58) Field of Classification Search
None
See application file for complete search history.

(56) References Cited

U.S. PATENT DOCUMENTS 10,133,986 B1 * 11/2018 Newton ................. G06N 10/40
2007/0250280 A1 * 10/2007 Beausoleil ............. B82Y 10/00
702/69

(Continued)

OTHER PUBLICATIONS

Z. Eldredge, et al., "Fast Quantum State Transfer and Entanglement Renormalization Using Long-Range Interactions", Phys. Rev. Lett. 119, 170503 (2017).

(Continued)

*Primary Examiner* — Xuyang Xia
(74) *Attorney, Agent, or Firm* — Carter, DeLuca & Farrell LLP; George Likourezos

(57) ABSTRACT

A system for quantum state transfer and entanglement generation includes a quantum system including a plurality of qubits, a processor, and a memory. The memory includes instructions stored thereon, which, when executed by the processor, cause the quantum system to: access a signal of the quantum system; encode unknown coefficients in one qubit of the plurality of qubits; initialize each of the remain- (Continued)

ing qubits of the plurality of qubits in state $|0\rangle$; group the plurality of qubits into a plurality of subsystems; in each of the plurality of subsystems: encode quantum information into Greenberger-Horne-Zeilinger-like (GHZ-like) states using nearest-neighbor interactions; and apply a generalized controlled-phase gate between the plurality of subsystems to merge the GHZ-like states into an entangled state between of the plurality of subsystems.

20 Claims, 9 Drawing Sheets

(56) References Cited

U.S. PATENT DOCUMENTS

| | | | | |
|---|---|---|---|---|
| 2018/0159636 | A1* | 6/2018 | Gorshkov | H04B 10/70 |
| 2019/0378033 | A1* | 12/2019 | Figgatt | G06N 10/70 |
| 2020/0409232 | A1* | 12/2020 | Weiner | G06N 10/20 |

OTHER PUBLICATIONS

M. C. Tran, et al., "Hierarchy of Linear Light Cones with Long-Range Interactions", Phys. Rev. X 10, 031009 (2020).

T. Kuwahara, et al., "Strictly Linear Light Cones in Long-Range Interacting Systems of Arbitrary Dimensions", Phys. Rev. X 10, 031010 (2020).

* cited by examiner (b)

$J_z > 0$ $E \neq 0$ $N = 2$ $|m_1\rangle$ $N = 1$ $N = 0$ $|m_0\rangle$ $|m_1\rangle$ $|m'_1\rangle$

SYSTEMS AND METHODS FOR OPTIMAL STATE TRANSFER AND ENTANGLEMENT GENERATION IN POWER-LAW INTERACTING SYSTEMS

CROSS-REFERENCE TO RELATED APPLICATIONS/CLAIM OF PRIORITY

This application claims the benefit of, and priority to, U.S. Provisional Patent Application No. 63/262,085, filed on Oct. 4, 2021, and U.S. Provisional Patent Application No. 63/378,210, filed on Oct. 3, 2022, the entire contents of each are hereby incorporated herein by reference.

GOVERNMENT SUPPORT

This invention was made with government support under W911NF1610349 awarded by the Department of the Army; DGE1840340 awarded by the National Science Foundation; and DMR1420541 awarded by the National Science Foundation (NSF). The government has certain rights in the invention.

TECHNICAL FIELD

The present disclosure relates generally to the field of quantum operations. More specifically, the present disclosure provides at least a system and method for encoding an arbitrary qubit into a multiqubit and subsequently transferring the quantum state.

BACKGROUND

Harnessing entanglement between many particles is key to a quantum advantage in applications including sensing and timekeeping, secure communication, and quantum computing. Encoding quantum information into a multiqubit Greenberger-Horne-Zeilinger-like state is particularly desirable as a subroutine in many quantum applications including metrology, quantum computing, anonymous quantum communication, and quantum secret sharing.

Accordingly, there is interest in encoding quantum information into a multiqubit Greenberger-Horner-Zeilinger-like state to improve harnessing entanglement.

SUMMARY

An aspect of the present disclosure provides a system for quantum state transfer and entanglement generation. The system includes a quantum system including a plurality of qubits, a processor, and a memory. The memory includes instructions stored thereon, which, when executed by the processor, cause the quantum system to: access a signal of the quantum system; encode unknown coefficients in one qubit of the plurality of qubits; initialize each of the remaining qubits of the plurality of qubits in state $|0\rangle$; group the plurality of qubits into a plurality of subsystems; in each of the plurality of subsystems: encode quantum information into Greenberger-Horne-Zeilinger-like (GHZ-like) states using nearest-neighbor interactions; and apply a generalized controlled-phase gate between the plurality of subsystems to merge the GHZ-like states into an entangled state between of the plurality of subsystems.

In accordance with aspects of the disclosure, the instructions, when executed by the processor, may further cause the quantum system to rotate the entangled state into a desired GHZ-like state by concentrating an entanglement in each subsystem of the plurality of subsystems onto one qubit $c_j$ of each of the plurality of subsystems.

In an aspect of the present disclosure, the instructions, when executed by the processor, may further cause the quantum system to apply a single-qubit rotation to $c_j$.

In another aspect of the present disclosure, the instructions, when executed by the processor, may further cause the quantum system to redistribute the entanglement to the plurality of subsystems as a resulting GHZ-like state.

In yet another aspect of the present disclosure, the instructions, when executed by the processor, may further cause the quantum system to repeatedly feed the resulting GHZ-like state back into applying a generalized controlled-phase gate between the plurality of subsystems to merge the GHZ-like states into an entangled state between of the plurality of subsystems to yield larger GHZ-like states.

In accordance with further aspects of the present disclosure, the system may further include a Hadamard gate. The rotation of $c_j$ is applied using the Hadamard gate.

In an aspect of the present disclosure, the subsystems may include hypercubes.

In another aspect of the present disclosure, the unknown coefficients may include a, b.

In yet another aspect of the present disclosure, the unknown coefficients of the one qubit of the plurality of qubits may be encoded as $a|0\rangle+b|1\rangle$.

In yet another aspect of the present disclosure, the quantum system may include a power-law interacting Hamiltonian.

An aspect of the present disclosure provides a method for quantum state transfer and entanglement generation. The method includes: accessing a signal of a quantum system, the quantum system including a plurality of qubits; encoding unknown coefficients in one qubit of the plurality of qubits; initializing each of the remaining qubits of the plurality of qubits in state $|0\rangle$; grouping the plurality of qubits into a plurality of subsystems; in each of the plurality of subsystems encoding quantum information into Greenberger-Horne-Zeilinger-like (GHZ-like) states using nearest-neighbor interactions; and applying a generalized controlled-phase gate between the plurality of subsystems to merge the GHZ-like states into an entangled state between of the plurality of subsystems.

In another aspect of the present disclosure, the method may further include rotating the entangled state into a desired GHZ-like state by concentrating an entanglement in each subsystem of the plurality of subsystems onto one qubit $c_j$ of each of the plurality of subsystems.

In yet another aspect of the present disclosure, the method may further include applying a single-qubit rotation to $c_j$.

In yet another aspect of the present disclosure, the method may further include redistributing the entanglement to the plurality of subsystems as a resulting GHZ-like state.

In accordance with further aspects of the present disclosure, the method may further include repeatedly feeding the resulting GHZ-like state back into applying a generalized controlled-phase gate between the plurality of subsystems to merge the GHZ-like states into an entangled state between of the plurality of subsystems to yield larger GHZ-like states.

In another aspect of the present disclosure, the subsystems may include hypercubes.

In yet another aspect of the present disclosure, the unknown coefficients may include a, b.

In a further aspect of the present disclosure, the unknown coefficients of the one qubit of the plurality of qubits may be encoded as $a|0\rangle+b|1\rangle$.

In a further aspect of the present disclosure, the rotation of $c_j$ may be applied using a Hadamard gate.

An aspect of the present disclosure provides a method for quantum state transfer and entanglement generation. The method includes: accessing a signal of a quantum system, the quantum system including a plurality of qubits; encoding $a|0\rangle+b|1\rangle$ in one qubit of the plurality of qubits; initializing each of the remaining qubits of the plurality of qubits in state $|0\rangle$; grouping the plurality of qubits into a plurality of hypercubes; in each of the hypercubes of the plurality of hypercubes encoding quantum information into Greenberger-Horne-Zeilinger-like (GHZ-like) states; merging the GHZ-like states into an entangled state between of the plurality of hypercubes; rotating the entangled state into a desired GHZ-like state; applying a single-qubit rotation to one bit of one of the plurality of hypercubes; and redistributing the entanglement to the plurality of hypercubes.

Further details and aspects of exemplary embodiments of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative embodiments, in which the principles of the present disclosure are utilized, and the accompanying drawings of which.

DETAILED DESCRIPTION

Figure 1:
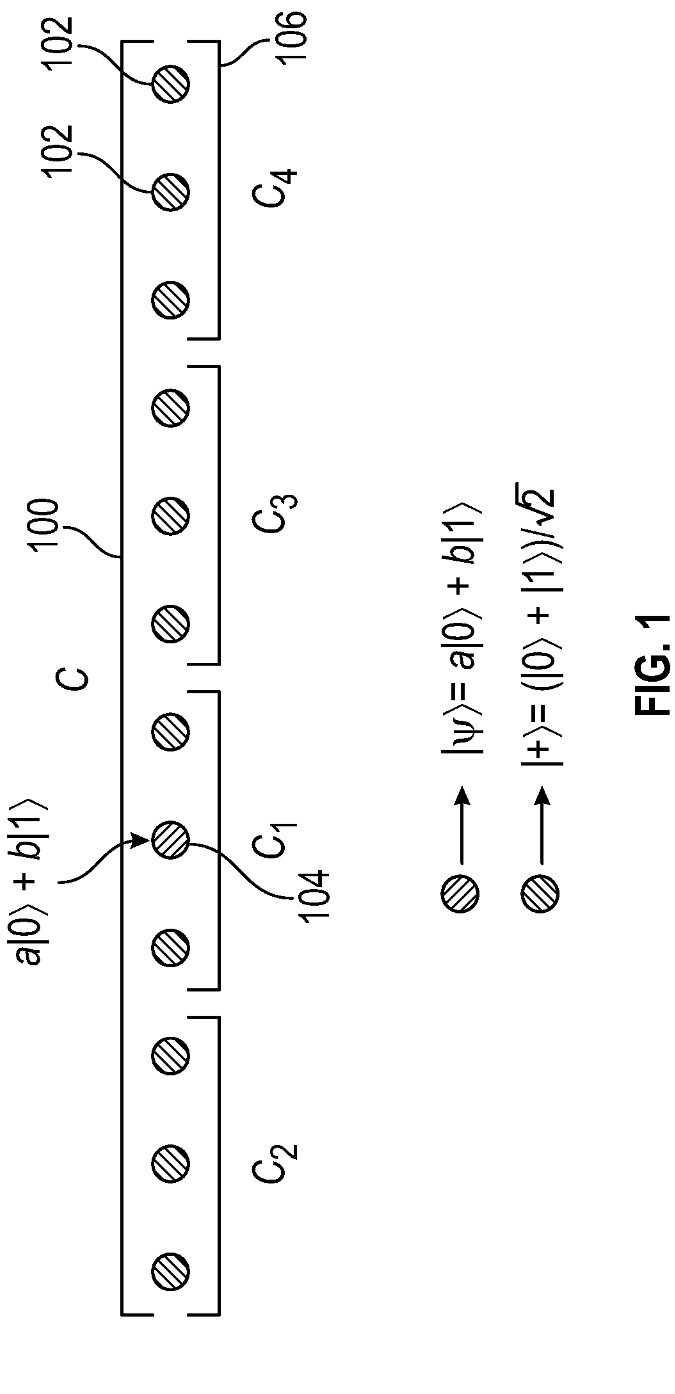
FIG. 1 is a diagram of an exemplary quantum system diagram, in accordance with examples of the present disclosure.

The present disclosure relates generally to the field of quantum operations. More specifically, the present disclosure provides a method for encoding an arbitrary qubit into a multiqubit and subsequently transferring the quantum state.

Embodiments of the present disclosure are described in detail with reference to the drawings wherein like reference numerals identify similar or identical elements.

Although the present disclosure will be described in terms of specific examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

Referring to FIG. 1, a diagram of an example quantum system 100 (e.g., hypercube C), is shown. The quantum system 100 may include two or more qubits 102. Qubits 102 may be arranged in a one- or more dimensional system 100. For example, the qubits 102 may be grouped into hypercubic latices. Although qubit systems are used as an example, it is contemplated that the disclosed technology may be used in qudit systems (arbitrary finite-level systems) as well.

Harnessing entanglement between many particles is key to a quantum advantage in applications including sensing and timekeeping, secure communication, and quantum computing. For example, encoding quantum information into a multiqubit Greenberger-Horne-Zeilinger-like (GHZ-like) state is particularly desirable as a subroutine in many quantum applications, including metrology, quantum computing, anonymous quantum communication, and quantum secret sharing.

The speed at which one can unitarily encode an unknown qubit state $a|0\rangle+b|1\rangle$ into a GHZ-like state $a|00\ldots0\rangle+b|11\ldots1\rangle$ of a large system is constrained by Lieb-Robinson bounds and depends on the nature of the interactions in the system. In systems with finite-range interactions and power-law interactions decaying with distance r as $1/r^{\alpha}$ for all $\alpha\geq 2d+1$, where d is the dimension of the system, the Lieb-Robinson bounds imply a linear light cone for the propagation of quantum information. Consequently, in such systems, the linear size of a GHZ-like state that can be prepared from unentangled particles cannot grow faster than linearly with time.

The disclosed method enables the encoding of a qubit into a GHZ-like state in a one-dimensional quantum system 100. Although a one dimensional system is used as an example, systems of larger dimensionality are contemplated.

Referring to FIGS. 1, 2, 3, and 8, a method 300 and illustrative schematic 800 for quantum state transfer and entanglement generation for the quantum system of FIG. 1 is shown. The system 800 for quantum state transfer and entanglement generation may include a processor system 810 (FIG. 8) and a memory 811, including instructions stored thereon, which when executed by the processor 810, cause the quantum system 100 to perform the steps of method 300.

The processor 810 may be connected to a computer-readable storage medium or a memory 811. The computer-readable storage medium or memory 811 may be a volatile type of memory, e.g., RAM, or a non-volatile type of memory, e.g., flash media, disk media, etc. In various aspects of the disclosure, the processor 810 may be any type of processor such as a digital signal processor, a microprocessor, an ASIC, a graphics processing unit (GPU), a field-programmable gate array (FPGA), or a central processing unit (CPU).

In aspects of the disclosure, the memory 811 can be random access memory, read-only memory, magnetic disk memory, solid-state memory, optical disc memory, and/or another type of memory. In some aspects of the disclosure, the memory 811 can be separate from the processor and can communicate with the processor through communication buses of a circuit board and/or through communication cables such as serial ATA cables or other types of cables. The memory 811 includes computer-readable instructions that are executable by the processor 810 to operate the processor. In other aspects of the disclosure, the system 800 may include a network interface to communicate with other computers or to a server. A storage device may be used for storing data.

Initially at step 110, the unknown coefficients a, b are encoded in one qubit 104 while the other qubits 102 are each initialized in state $|0\rangle$. The next step 120 of the method 300 assumes the ability to encode information into GHZ-like states in subsystems $C_1, \ldots, C_4$ 106 using, for example, nearest-neighbor interactions. Next at step 130, a generalized controlled-phase gate (Eqn. 6) is applied between the subsystems 106 to "merge" the GHZ-like states into an entangled state between all sites (FIGS. 2 and 4).

Figure 2:
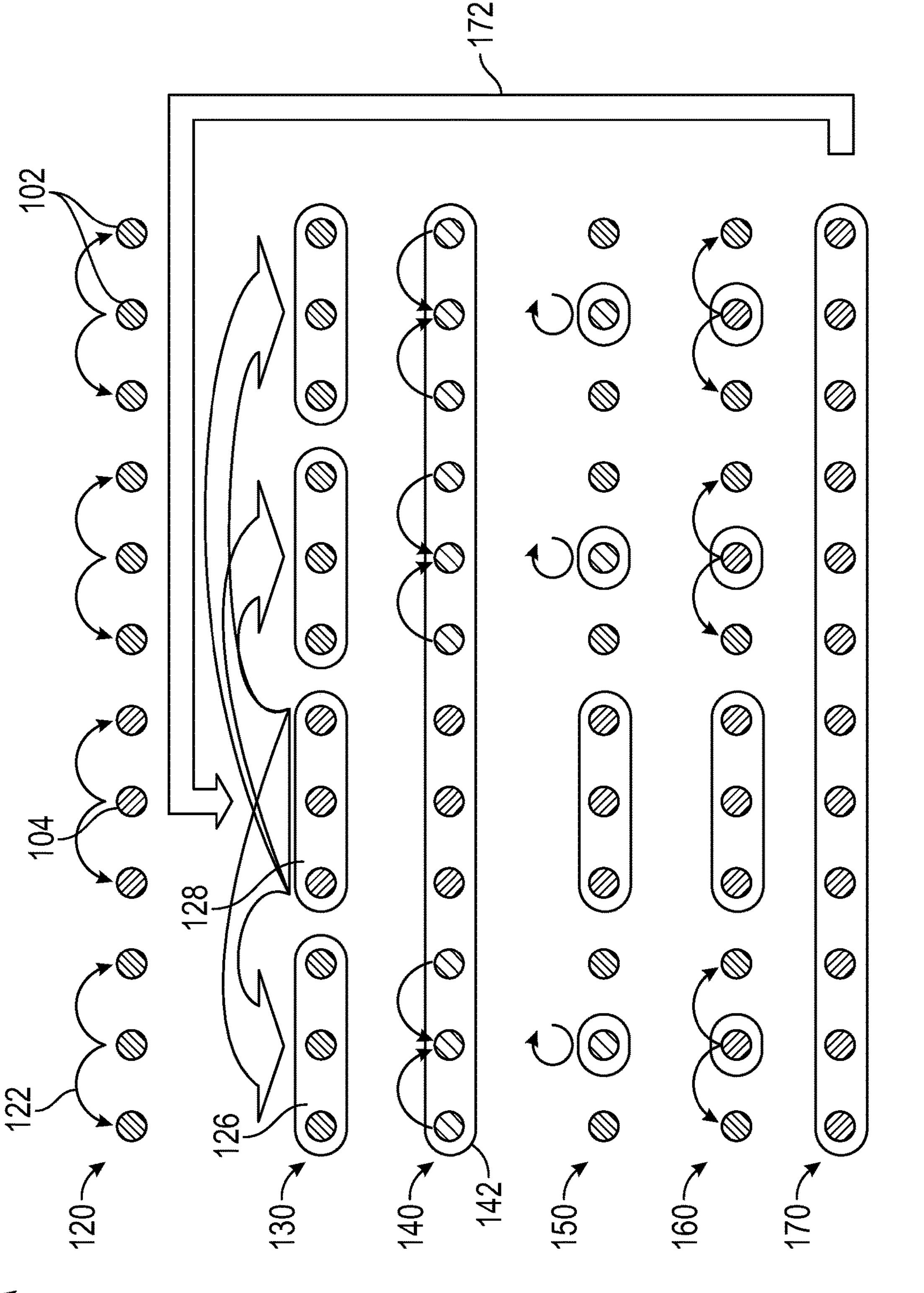
FIG. 2 is a diagram of a method for quantum state transfer and entanglement generation for the quantum system of FIG. 1, in accordance with examples of the present disclosure.
Figure 3:
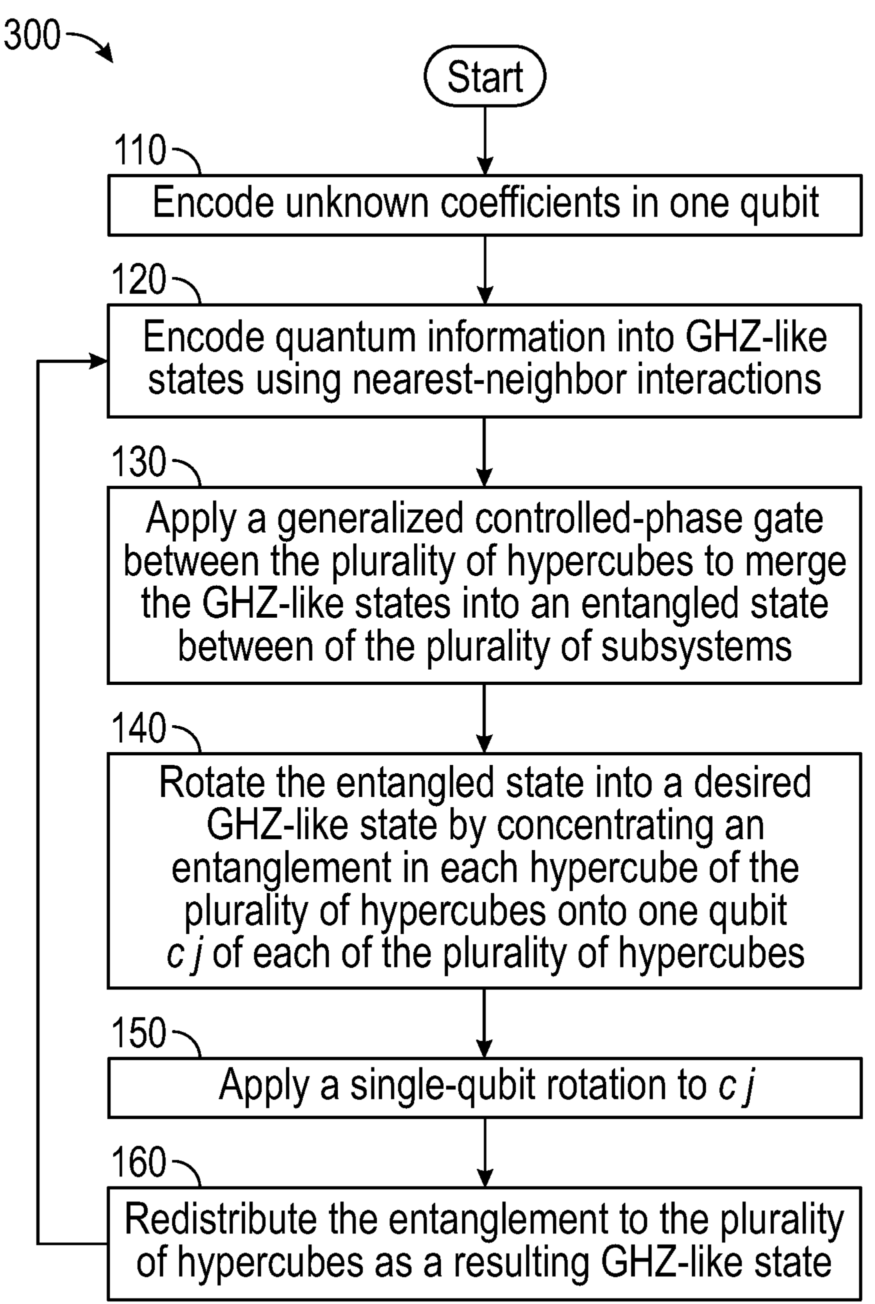
FIG. 3 illustrates a flow diagram of the method for encoding an arbitrary qubit into a multiqubit and subsequently transferring the quantum state for the quantum system of FIG. 1, in accordance with examples of the present disclosure.
Figure 4:
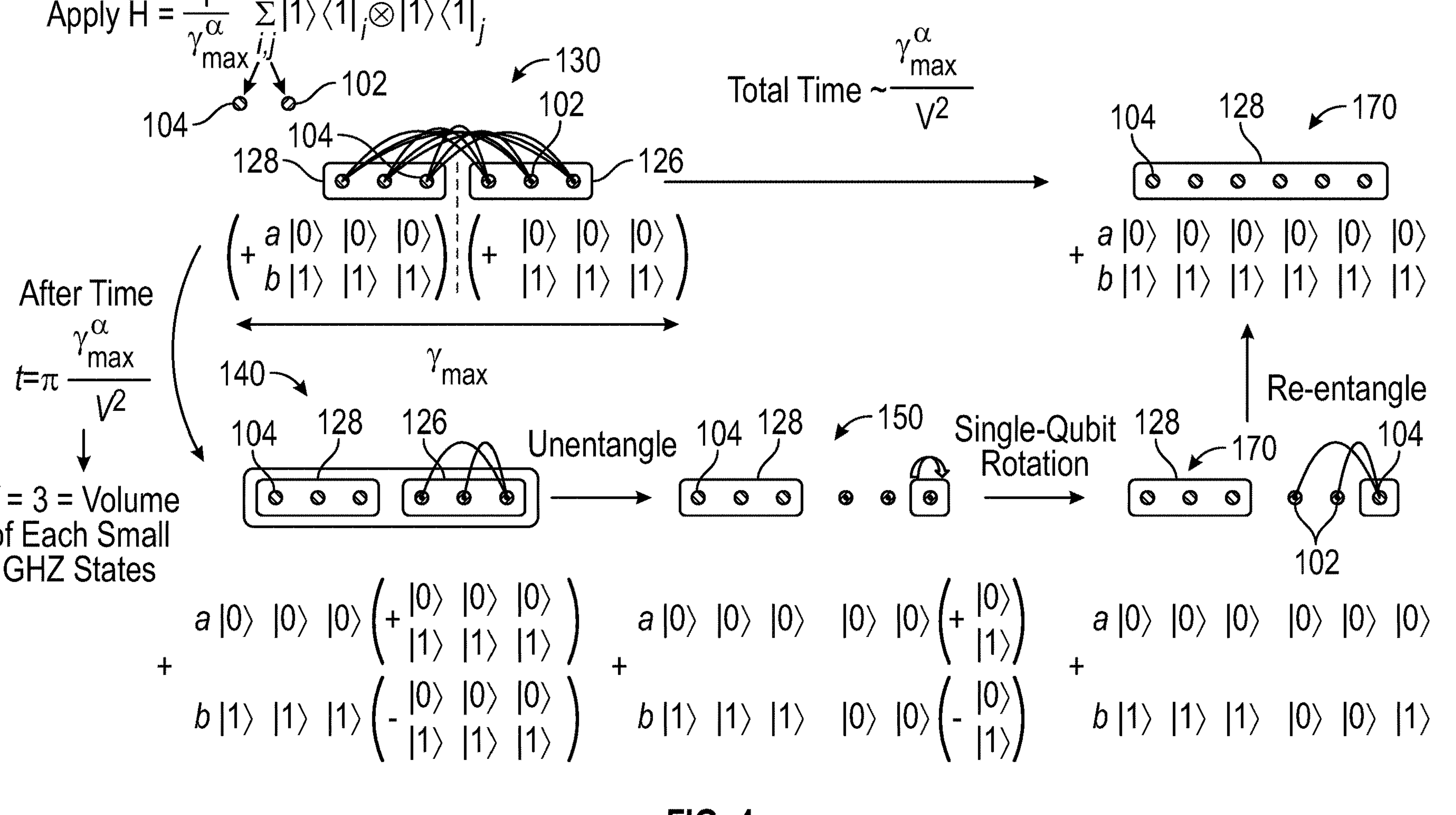
FIG. 4 is a diagram illustrating quantum state transfer of FIG. 1, in accordance with examples of the present disclosure.

At step 140, the entangled state is rotated into the desired GHZ-like state by concentrating the entanglement in each subsystem 126 onto one qubit 152 (FIGS. 2 and 4).

At step 150, single-qubit rotations are applied. For example, qubit 152 $c_j$ of each subsystem 126 may be rotated.

At step 160 the entanglement is redistributed to the rest of the quantum system 100. Repeatedly feeding the resulting GHZ-like state back into step 130 of the method 300 yields larger and larger GHZ-like states.

The Lieb-Robinson bounds become less stringent for longer-range interactions, i.e., those with $\alpha<2d+1$. The bounds theoretically allow quantum information to travel a distance r in time t that scales sublinearly with r. However, no method in the present literature can saturate these bounds. In particular, existing methods for $\alpha\in(d, 2d]$ are exponentially slower than what is allowed by the corresponding bounds. Up until now, the existence of this gap between the Lieb-Robinson bounds and the achievable methods has meant that at least one of the two is not yet optimal, hinting at either a tighter Lieb-Robinson bound or the possibility of speeding up many quantum information processing tasks.

The disclosed technology closes the gap for all $\alpha\in(d, 2d+1]$ in $d\geq1$ by designing method 300 for encoding an arbitrary qubit into a multiqubit GHZ-like state and, subsequently, transferring information at the limits imposed by the Lieb-Robinson bounds. There are at least three implications of the method. First, within these regimes of a, the disclosed technology establishes the tightness of the Lieb-Robinson bounds, up to sub-polynomial corrections, and effectively puts an end to the fifteen-year search for a tighter bound. The disclosed technology may provide optimal designs for power-law interacting systems, including trapped ions ($\alpha\in[0,3]$) in one and two dimensions, ultracold atoms in photonic crystals, van-der-Waals interacting Rydberg atoms ($\alpha=6$) in three dimensions, as well as the very common case of dipolar interactions in nitrogen-vacancy centers, polar molecules, and dipole-dipole interacting Rydberg atoms ($\alpha=3$) in two dimensions. Finally, the disclosed technology implies a lower bound on the gate count in simulating power-law interacting systems on a quantum computer, providing a benchmark for the performance of quantum simulation algorithms.

For simplicity, a d-dimensional hypercubic lattice A and a two-level system located at every site of the lattice is considered. It is contemplated that the disclosed technology generalizes straightforwardly to all regular lattices. Without loss of generality, it is assumed that the lattice spacing is one. A power-law interacting Hamiltonian $H(t)=\Sigma_{i,j\in\Lambda} h_{ij}(t)$, where $h_{ii}(t)$ is a Hamiltonian supported on sites i, j such that, at all times t and for all $i\neq j$, provides $\|h_{ij}\|\leq1/\text{dist}(i, j)^{\alpha}$, where dist(i, j) is the distance between i, j, $\|\bullet\|$ is the operator norm, and $\alpha\geq0$ is a constant. $|GHZ(a, b)\rangle_S$ is used to denote the GHZ-like state over sites in $S\subseteq A$:

$$|GHZ(a, b)\rangle_S \equiv a|\overline{0}\rangle_S + b|\overline{1}\rangle_S, \quad \text{(Eqn. 1)}$$

where $|\overline{x}\rangle_S\equiv\otimes_{j\in S}|x\rangle_j$ (x=0.1) are product states over all sites in S and a, b are complex numbers such that $|a|^2+|b|^2=1$. In particular, $|GHZ\rangle$ is used to denote the symmetric state $a=b=1/\sqrt{2}$.

Given a d-dimensional hypercube $C\subseteq\Lambda$ of length $r\geq1$, encode a possibly unknown state $a|0\rangle+b|1\rangle$ of a site c E C into the GHZ-like state $|GHZ(a, b))_C$ over C, assuming that all sites in C, except for c, are initially in the state $|0\rangle$. Specifically, a time-dependent, power-law interacting Hamiltonian H(t) that generates $$U(t) = \mathcal{T}\exp\left(-i\int_0^t dsH(s)\right)$$

is constructed that satisfies:

$$U(t)(a|0\rangle + b|1\rangle)_c|\overline{0}\rangle_{C\backslash c} = a|\overline{0}\rangle_C + b|\overline{1}\rangle_C \quad \text{(Eqn. 2)}$$

at time:

$$t(r) \leq K_\alpha \times \begin{cases} \log^{\kappa_\alpha} r & \text{if } d < \alpha < 2d, \\ e^{\gamma\sqrt{\log r}} & \text{if } \alpha = 2d, \text{ and} \\ r^{\alpha-2d} & \text{if } 2d < \alpha \leq 2d+1 \end{cases}. \quad \text{(Eqn. 3)}$$

Here, $\gamma=3\sqrt{d}$, $\kappa_a$, and $\kappa_a$ are constants independent of t and r. Additionally, by reversing the unitary in Eqn. 2 to "concentrate" the information in $|GHZ(a, b)\rangle$ onto a different site in C, a quantum state may be transferred from $c\in C$ to any other site $c'\in C$ in time 2t.

The disclosed method recursively builds the GHZ-like state in a large hypercube from the GHZ-like states of smaller hypercubes. For the base case, hypercubes of finite lengths, i.e., $r\leq r_0$ for some fixed $r_0$, can always be generated in times that satisfy Eqn. 3 for some suitably large (but constant) prefactor $K_\alpha$. Assuming that information can be encoded into a GHZ-like state in hypercubes of length $r_1$ in time $t_1$ satisfying Eqn. 3, the following subroutine encodes information into a GHZ-like state in an arbitrary hypercube C of length $r=mr_1$ containing c, the site initially holding the phase information a, b. Here m is an a-dependent number to be chosen later.

At step 120, the hypercube C is divided into $m^d$ smaller hypercubes $C_1, \ldots C_{m^d}$, each of length $r_1$. Without loss of generality, $C_1$ is the hypercube that contains c.

$$\text{Let } V = r_1^d$$

be the number of sites in each $C_j$. a, b are simultaneously encoded into $|GHZ(a, b)\rangle_{C_1}$ and prepare $|GHZ\rangle_{C_j}$ for all j=2, . . . , $m^d$, which, takes time $$t_1 \le K_\alpha \times \begin{cases} \log^{\kappa_\alpha} r_1 & \text{if } d < \alpha < 2d, \\ e^{\gamma\sqrt{\log r_1}} & \text{if } \alpha = 2d, \text{ and} \\ r_1^{\alpha-2d} & \text{if } 2d < \alpha \le 2d+1 \end{cases} . \quad \text{(Eqn. 4)}$$

By the end of this step, the hypercube C is in the state $$(a|\overline{0}\rangle + b|\overline{1}\rangle)_{C_1} \bigotimes_{j=2}^{m^d} \frac{|\overline{0}\rangle_{C_j} + |\overline{1}\rangle_{C_j}}{\sqrt{2}}. \quad \text{(Eqn. 5)}$$

Next, at step 130 the following Hamiltonian is applied to the hypercube C:

$$H_2 = \frac{1}{(mr_1\sqrt{d})^\alpha} \sum_{j=2}^{m^d} \sum_{\mu\in C_1} \sum_{\nu\in C_j} |1\rangle\langle 1|_\mu \otimes |1\rangle\langle 1|_\nu. \quad \text{(Eqn. 6)}$$

This Hamiltonian effectively generates the so-called controlled-PHASE gate between the hypercubes, with $C_1$ being the control hypercube and $C_2, \ldots, C_{m^d}$ being the target hypercubes. The interactions between qubits in Eqn. 6 are selected to be identical for simplicity. If the interactions were to vary between qubits, the interaction between $C_1$ and $C_j$ may be turned off once the total phase accumulated by $C_j$ reaches $\pi$. The prefactor $1/(mr_1\sqrt{d})^\alpha$ ensures that this Hamiltonian satisfies the condition of a power-law interacting Hamiltonian. It is straightforward to verify that, under this evolution, the state of the hypercube C rotates to:

$$a|\overline{0}\rangle_{C_1} \bigotimes_{j=2}^{m^d} \frac{|\overline{0}\rangle_{C_j} + |\overline{1}\rangle_{C_j}}{\sqrt{2}} + b|\overline{1}\rangle_{C_1} \bigotimes_{j=2}^{m^d} \frac{|\overline{0}\rangle_{C_j} - |\overline{1}\rangle_{C_j}}{\sqrt{2}} \quad \text{(Eqn. 7)}$$

after time $t_2=\pi d^{\alpha/2}(mr_1)^\alpha/V^2$.

To obtain the desired state $|GHZ(a, b)\rangle_C$, it remains to apply a Hadamard gate on the effective qubit $\{|\overline{0}\rangle_{C_j}, |\overline{1}\rangle_{C_j}\}$ for j=2, . . . , $m^d$. The Hadamard gate is applied in the following three steps by first concentrating the information stored in hypercube $C_j$ onto a single site $c_j \in C_j$ (Step 3), then applying a Hadamard gate on $c_j$ (Step 4), and then unfolding the information back onto the full hypercube $C_j$ (Step 5).

Next, at step 140, for each hypercube $C_j$ (j=2, . . . , $m^d$) and given a designated site $c_j \in C_j$, there exists a (time-dependent) Hamiltonian $H_j$ that generates a unitary $U_j$ such that $$(\psi_0|0\rangle + \psi_1|1\rangle)_{c_j}|\overline{0}\rangle_{C_j\backslash c_j} \xrightarrow{U_j} \psi_0|\overline{0}\rangle_{C_j} + \psi_1|\overline{1}\rangle_{C_j} \quad \text{(Eqn. 8)}$$

for all complex coefficients $\psi_0$ and $\psi_1$, in time $t_1$ satisfying Eqn. 4. By linearity, this property applies even if $C_j$ is entangled with other hypercubes. Consequently, backward time evolution under $H_j$ generates $$U_j^\dagger,$$

which "undoes" the GHZ-like state of the jth hypercube:

$$\psi_0|\overline{0}\rangle_{C_j} + \psi_1|\overline{1}\rangle_{C_j} \xrightarrow{U_j^\dagger} (\psi_0|\overline{0}\rangle + \psi_1|1\rangle)_{c_j}|\overline{0}\rangle_{C_j\backslash c_j} \quad \text{(Eqn. 9)}$$

for any $\psi_0$, $\psi_1$. In this step, $$U_j^\dagger$$

is simultaneously applied to $C_j$ for all j=2, . . . , $m^d$. These unitaries rotate the state of C to:

$$a|\overline{0}\rangle C_1 \bigotimes_{j=1}^{m^d} |+\rangle_{c_j}|\overline{0}\rangle_{C_j\backslash c_j} + b|\overline{1}\rangle_{C_1} \bigotimes_{j=1}^{m^d} |-\rangle_{c_j}|\overline{0}\rangle_{C_j\backslash c_j}, \quad \text{(Eqn. 10)}$$

where $|+\rangle = (|0\rangle \pm |1\rangle)/\sqrt{2}$.

Next, at step 150 a Hadamard gate is applied, $$\frac{1}{\sqrt{2}}\begin{pmatrix} 1 & 1 \\ 1 & -1 \end{pmatrix},$$

(Eqn. 11) to the site $c_j$ of each hypercubes $C_j$, j=2, . . . , $m^d$. These Hadamard gates can be implemented arbitrarily fast since any constraints are not assumed on the single-site terms of the Hamiltonian. The state of C by the end of this step is:

$$a|\overline{0}\rangle_{C_1} \bigotimes_{j=2}^{m^d} |0\rangle_{c_j}|\overline{0}\rangle_{C_j\backslash c_j} + b|\overline{1}\rangle_{C_1} \bigotimes_{j=2}^{m^d} |1\rangle_{c_j}|\overline{0}\rangle_{C_j\backslash c_j}. \quad \text{(Eqn. 12)}$$

Next at step 160, $U_j$ is applied again to each hypercube $C_j$ (j=2, . . . , $m^d$) to obtain the desired GHZ-like state:

$$a|\overline{0}\rangle_{C_1} \bigotimes_{j=2}^{m^d} |\overline{0}\rangle_{C_j} + b|\overline{1}\rangle_{C_1} \bigotimes_{j=2}^{m^d} |\overline{1}\rangle_{C_j} = |GHZ(a, b)\rangle_C. \quad \text{(Eqn. 13)}$$

At the end of this routine, the unitary satisfying Eqn. 2 in time $$t = 3t_1 + t_2 = 3t_1 + \pi d^{\alpha/2} m^\alpha r_1^{\alpha-2d} \quad \text{(Eqn. 14)}$$

has been implemented.

Three cases corresponding to different ranges of a are considered and it is shown that if $t_1(r_1)$ satisfies Eqn. 3, then t(r) also satisfies Eqn. 3.

$$\text{For } \alpha \in (2d, 2d+1],\ t_1 \leq K_\alpha r_1^{\alpha-2d}.$$

Selecting m>1 to be a constant integer provides:

$$t \leq \left(\frac{3K_\alpha}{m^{\alpha-2d}} + \pi d^{\alpha/2} m^{2d}\right)(mr_1)^{\alpha-2d} \leq K_\alpha r^{\alpha-2d}, \quad \text{(Eqn. 15)}$$

$$\text{where } m > 3^{1/(\alpha-2d)} \text{ and} \quad \text{(Eqn. 16)}$$

$$K_\alpha \geq \frac{\pi d^{\alpha/2} m^{2d}}{1 - \frac{3}{m^{\alpha-2d}}} = \frac{\pi d^{\alpha/2} m^{\alpha}}{m^{\alpha-2d} - 3} \text{ is selected.}$$

For $\alpha \in (d, 2d)$, m is chosen to scale with $r_1$ such that $$r_1^{\lambda-1} < m \leq 2r_1^{\lambda-1}$$

where $\lambda = 2d/\alpha$. The length of the larger cube C is then $$r = mr_1 > r_1^{\lambda}$$

and, therefore, the total time is:

$$t \leq 3K_\alpha \log^{\kappa_\alpha} r_1 + \pi(2\sqrt{d})^{\alpha} r_1^{(\lambda-1)\alpha+\alpha-2d} \quad \text{(Eqn. 17)}$$

$$\leq \frac{4K_\alpha}{\lambda^{\kappa_\alpha}} \log^{\kappa_\alpha}(r_1^{\lambda}) \leq K_\alpha \log^{\kappa_\alpha} r, \quad \text{(Eqn. 18)}$$

where $\kappa_\alpha = \log 4/\log(2d/\alpha)$ is selected and $K_\alpha \log^{K_\alpha} r_1 \geq \pi(2\sqrt{d})^{\alpha}$ is assumed to simplify the expression. The factor log 4 in the definition of $\kappa_a$ may be made arbitrarily close to log 3 by increasing $K_\alpha$.

Finally, for $\alpha = 2d$, m is chosen such that $$\exp\left(\frac{\gamma}{2d}\sqrt{\log r_1}\right) \leq m \leq 2\exp\left(\frac{\gamma}{2d}\sqrt{\log r_1}\right),$$

where $\gamma = 3\sqrt{d}$. Substituting $t_1 \leq K_\alpha \exp(\gamma\sqrt{\log r_1})$ into Eqn. 14:

$$t \leq (3K_\alpha + 2^{\alpha}\pi d^{\alpha/2}) e^{\gamma\sqrt{\log r_1}}. \quad \text{(Eqn. 19)}$$

Assuming $r_1 \geq \exp(8/d)$, it is straightforward to prove that $\gamma\sqrt{\log r_1} \leq \gamma\sqrt{\log(mr_1)} - 2$. Applying this condition on the above inequality:

$$t \leq \frac{1}{e^2}(3K_\alpha + 2^{\alpha}\pi d^{\alpha/2}) e^{\gamma\sqrt{\log r}} \leq K_\alpha e^{\gamma\sqrt{\log r}}, \quad \text{(Eqn. 20)}$$

where $r = mr_1$ is the length of the resulting GHZ-like state and $K_\alpha \geq 2^{\alpha}\pi d^{\alpha/2}/(e^2-3)$ is selected. Eqn. 15, Eqn. 18, and Eqn. 20 prove that t satisfies Eqn. 3. Repeatedly applying this routine yields larger and larger GHZ-like states.

In the disclosed method, quantum information is simultaneously encoded into the GHZ-like state over $C_1$ and the symmetric GHZ states are created over other multiqubit subsystems $C_2, \ldots, c_{m^d}$. As a result, the implementation of the controlled operations in step 130 (FIG. 1) is enhanced quadratically by the volume of each subsystems.

In aspects, the size of the resulting GHZ-like state may be maximized at the end of each iteration by allowing m to depend on a and on the size of the existing GHZ-like states. When the disclosed method is used for state transfer, this strategy results in most of the qubits between the source and the target sites participating in the transfer, significantly speeding up the disclosed method.

First, the disclosed method enables encoding an unknown qubit into a multiqubit GHZ-like state and, subsequently, performing state transfer at unprecedented speeds. For $d < \alpha < 2d$, which applies, for example, to dipole-dipole interactions ($\alpha=3$) in two dimensions and to the effective interactions between trapped ions ($\alpha \in [0,3]$) in one and two dimensions, the disclosed method encodes information into GHZ-like states and transfers information in polylogarithmic time, exponentially faster than methods available in the literature. Even for the seemingly weakly long-range interactions with $\alpha=2d$, such as van der Waals interactions between Rydberg atoms ($\alpha=6$) in three dimensions, the disclosed method still takes only sub-polynomial time to entangle an entire system and to transfer a quantum state. When applied to the preparation of GHZ states, these speedups enable potential improvements to quantum sensors built from nitrogen-vacancy centers, Rydberg atoms, and polar molecules, as well as to atomic clocks based on trapped ions.

The optimality of the disclosed systems and methods for $\alpha \in (1,3)$ in one dimension and $\alpha \in (d, 2d]$ in d>1 dimensions also lays the foundation for optimal quantum information processing in power-law interacting systems. Using quantum state transfer between auxiliary qubits and encoding qubits into large GHZ-like states as subroutines, the disclosed systems and methods leads to optimal implementations of quantum gates between distant qubits in large quantum computers. In particular, the faster encoding of information into a GHZ-like state of ancillary qubits speeds up the implementation of the quantum fanout—a powerful multiqubit quantum gate. At the same time, the faster state transfer speeds up the constructions of multiscale entanglement renormalization ansatz (MERA) states, commonly used to represent highly entangled states, such as topologically ordered states. Specifically, a fanout gate may be implemented on qubits in a hypercube of volume n and prepare a MERA state on these qubits in time t~polylog(n) for $\alpha \in (d, 2d)$, $$t \sim e^{\frac{\gamma}{\sqrt{d}}\sqrt{\log n}}$$

for $\alpha=2d$, which are both exponential speedups compared to the previous best, and $t \sim n^{(\alpha-2d)/d}$ for $\alpha \in (2d, 2d+1)$. The optimality of these operations is again guaranteed (up to sub-polynomial corrections) by the matching lower limits imposed by the Lieb-Robinson bounds.

In practice, using single-site Hamiltonians to implement the echoing technique the controlled-PHASE gate in step 130 of the disclosed systems and methods can be realized starting from time-independent power-law interactions between all sites of the system. The method therefore does not require explicit time-dependent control of individual two-qubit Hamiltonians, making it appealing for implementation on available experimental platforms. However, because the diameter of the GHZ-like state increases by more than twofold in every iteration of the method, the scaling in Eqn. 3 may only be observed in large systems.

Information-propagation speed limits.—Conceptually, since the disclosed systems and methods saturate (up to sub-polynomial corrections) the Lieb-Robinson bounds for $d<\alpha\leq 2d+1$ for all d and, additionally, $2<\alpha<3$ for $d=1$, the tightness of these fundamental bounds in these regimes is demonstrated. In particular, the sub-polynomial entanglement time for $\alpha\leq 2d$ disproves the conjecture where a gap in the provable heating times of periodically driven, power-law interacting systems had suggested the existence of a tighter Lieb-Robinson bound with an algebraic light cone in this regime of α. Additionally, for $2d<\alpha<2d+1$, the disclosed systems and methods suggests that $t\gtrsim r^{\alpha-2d}$ is the tightest possible light cone, providing strong evidence for the conjectured generalization of the Lieb-Robinson bound to $d>1$.

Since the best known generalizations of these bounds to k-body, power-law interacting Hamiltonians—those described by $H=\Sigma_X h_X$, where the sum is over all subsets $X\subset\Lambda$ of at most k sites and $\Sigma_{X\ni i,j}\|h_X\|\leq 1/\text{dist}(i, j)^\alpha$ for all $i\neq j$, have the same scaling as the best known 2-body bounds when $d<\alpha\leq 2d$, the scaling of the disclosed 2-body method is also optimal even if one allows for k-body interactions. In other words, in this regime of a, allowing for k-body interactions cannot enable a qualitative speedup relative to 2-body interactions.

The disclosed systems and methods also generalizes straightforwardly from two-level to arbitrary finite-level systems. Given a q-level system at each site of the lattice, an arbitrary state $$|\psi\rangle_c=\sum_{\ell=0}^{q-1}a_\ell|\ell\rangle$$

of site $c\in C$ may be unitarily encoded, where $a_l$ are complex coefficients and C is a hypercube of linear size r, into a multi-qudit state:

$$|\psi\rangle_C|\bar{0}\rangle_{C\setminus c}\rightarrow\sum_{\ell=0}^{q-1}a_\ell|\bar{\ell}\rangle_C \quad \text{(Eqn. 21)}$$

in time t(r) satisfying Eqn. 3. This can be done by replacing the Hamiltonian in Eqn. 6 with:

$$\frac{1}{(mr_1\sqrt{d})^\alpha}\Sigma_{j=2}^{m^d}\Sigma_{\mu\in C_1}\Sigma_{\nu\in C_j}\Sigma_{\ell,\ell'=0}^{q-1}\ell\ell'|\ell\rangle\langle\ell|_\mu\otimes|\ell'\rangle\langle\ell'|_\nu \quad \text{(Eqn. 22)}$$

and replacing the single-qubit Hadamard gate in step 4 by a q-by-q discrete Fourier transform matrix. Since the Lieb-Robinson bounds have the same light cones for any finite-level systems, the disclosed systems and methods also saturates these bounds a E (d, 2d+1] in $d\geq 1$ dimensions.

In aspects, $a|0\rangle+b|1\rangle$ may be assumed to be a possibly unknown state. Encoding such a state into the GHZ-like state is at least as hard as generating a GHZ-like state with known coefficients a, b. In fact, the latter task is not known to be sufficient for state transfer and, therefore, is not directly constrained by the Lieb-Robinson bounds. Instead, one often indirectly obtains a speed limit for this task by applying the Lieb-Robinson bounds on the growth of two-point connected correlators. Consequently, the task of generating a known GHZ-like state could potentially be constrained by a weaker light cone than that of encoding an unknown qubit state into a GHZ-like state. Nevertheless, the disclosed systems and methods for encoding into a GHZ-like state saturates (up to sub-polynomial corrections) the bound $t\gtrsim\log r$ on the growth of connected correlators when $d<\alpha\leq 2d$, implying that knowing the coefficients a, b does not speed up the preparation of the GHZ-like state in this regime. The same statement may hold for $\alpha\in(2d, 2d+1)$.

The disclosed violates the so-called Frobenius light cone, for $\alpha>1$ in one dimension as part of a hierarchy of speed limits for different types of information propagation in long-range interacting systems and later extended to regimes of smaller α. The Frobenius bound, which considers information propagation from the operator-spreading perspective, constrains information-propagation tasks that are more demanding than the tasks that saturate the Lieb-Robinson bound, and therefore has a more stringent light cone. For example, quantum state transfer given intermediate qubits in arbitrary initial states (i.e., universal state transfer) is constrained by the Frobenius light cone, whereas state transfer assuming initialized intermediate qubits is constrained by the Lieb-Robinson bound and can actually violate the Frobenius light cone. The presently disclosed methods prove for the first time that the task of encoding information into GHZ-like state, which is at least as hard as state transfer with initialization—is not constrained by the Frobenius light cone, but is instead tightly constrained (up to sub-polynomial corrections) by the Lieb-Robinson bound. In particular, when $d<\alpha<2d$, the disclosed systems and methods prove that state transfer with initialization can be implemented exponentially faster than state transfer without initialization, which is constrained by polynomial light cones in this regime. Furthermore, since the disclosed systems and methods for encoding into a GHZ-like state can also be used to prepare a known GHZ-like state, the disclosed systems and methods also prove for the first time that preparing a known GHZ-like state is not constrained by the Frobenius light cone.

In aspects, the disclosed method can be generalized to the regime $0\leq\alpha\leq d$, where there are still substantial gaps between the Lieb-Robinson bounds and achievable methods. The bounds suggest that, in addition to the distance, the information-propagation time also depends on the total number of sites on the lattice.

The disclosed systems and methods also give the first known example of a lower bound on the gate count in simulating power-law systems on a quantum computer: it takes $\Omega(n)$ elementary quantum gates to simulate an n-qubit power-law system evolving for time $t\geq t_*$, where:

$$t_*=\begin{cases}\Theta(\log^{\kappa_\alpha}n) & \text{if } d<\alpha<2d,\\ \Theta\left(e^{\gamma\sqrt{(\log n)/d}}\right) & \text{if } \alpha=2d, \text{ and}\\ \Theta\left(n^{\alpha/d-2}\right) & \text{if } 2d<\alpha\leq 2d+1\end{cases}, \quad \text{(Eqn. 23)}$$

to constant error.

Lower bounds on the simulation gate count are valuable benchmarks for the performance of quantum algorithms. To date, despite progressively more efficient quantum simulation algorithms in recent literature, no saturable lower bounds are known for power-law systems. For example, the analysis of the Suzuki-Trotter product formulas results in upper bounds, $$g_\alpha = \begin{cases} O\left(n^{2+o(1)} t^{1+o(1)}\right) & \text{if } d < \alpha \le 2d, \\ O\left((\mathrm{nt})^{1+d/(\alpha-d)+o(1)}\right) & \text{if } \alpha > 2d \end{cases}, \quad \text{(Eqn. 24)}$$

for simulating an n-qubit power-law system for time t. At $t=t_*$ given in Eqn. 23, the corresponding upper bounds reduce to $$g_\alpha = \begin{cases} O\left(n^{2+o(1)}\right) & \text{if } d < \alpha \le 2d, \\ O\left(n^{\alpha/d+o(1)}\right) & \text{if } 2d < \alpha \le 2d+1 \end{cases}. \quad \text{(Eqn. 25)}$$

The gap between this state-of-the-art upper bound and the lower bound Ω(n) of the disclosed systems and methods hints at the possibility of a more efficient algorithm for simulating power-law systems.

Figures 5A, 5B:
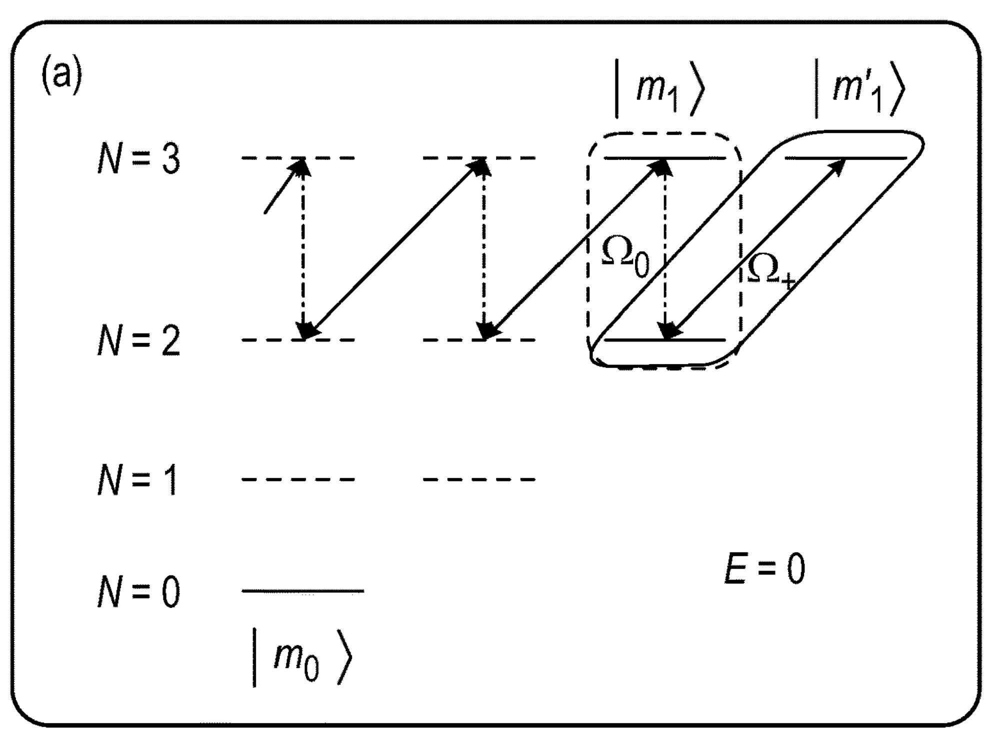
FIGS. 5A-C is a diagram illustrating a scheme for realizing dipole-dipole Ising interactions using polar molecules, in accordance with examples of the present disclosure.
Figure 5C:
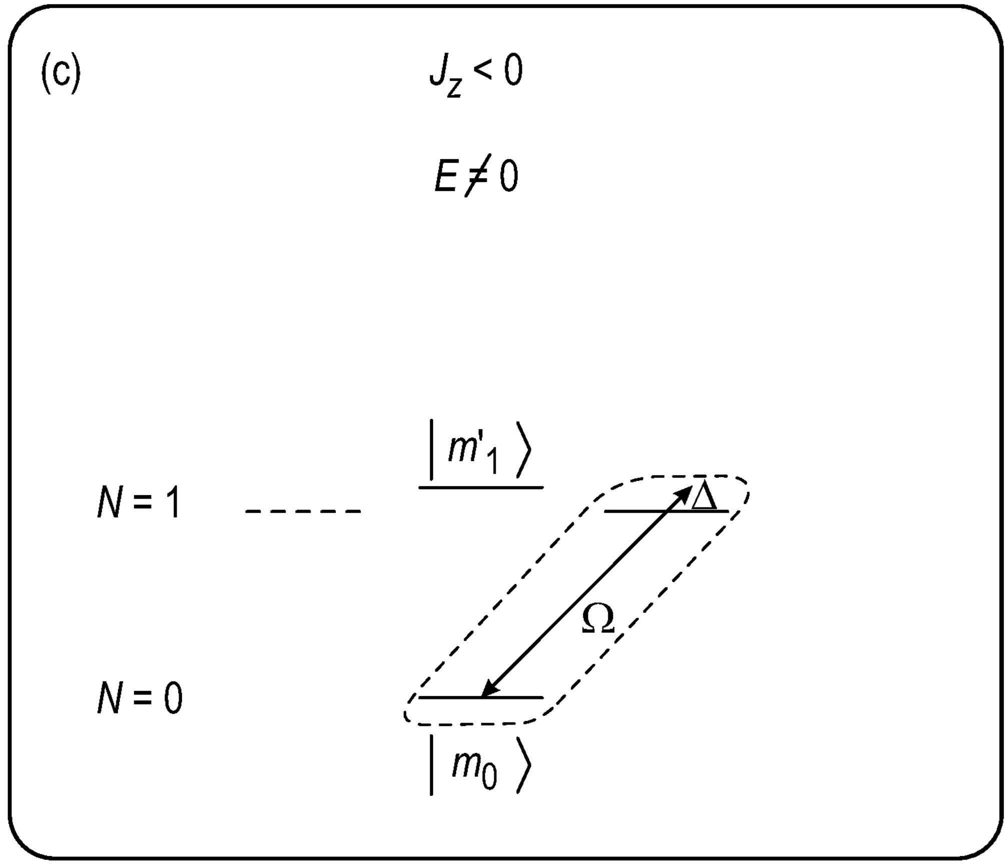

Regarding FIGS. 5A-C, a diagram illustrating a scheme for realizing dipole-dipole Ising interactions using polar molecules is shown. In the state transfer method, there are three types of qubits: control qubits, target qubits, and uninvolved qubits. The uninvolved qubits, which are confined to a single state, can generally be prepared easily by storing them in a state which does not interact with the other two types of qubit. For the control and target qubits, a Hamiltonian with long-range Ising interactions between control and target qubits is used. However, the control qubits must not interact with themselves, and similarly the target qubits must not interact with themselves. However, this behavior does not generically occur and must be engineered.

The spin-echo-like approach is used. This approach relies on the ability to realize a Hamiltonian of the form $$H_{int} = \frac{1}{2}\sum_{i \ne j} J_{ij} Z_i Z_j, \quad \text{(Eqn. 26)}$$

as well as its negative $-cH_{int}$, where $Z_i$ denotes the Pauli-Z matrix for the ith qubit. By evolving under $H_{int}$ for a time t, applying a Pauli-X gate to either the control or the target qubits, and evolving under $-cH_{int}$ for a time t/c, the evolution from the control-control and target-target interactions are undone while the control-target interactions remain, as desired. In light of this, most of the following discussion will be centered around how to realize both signs of the Ising interactions. Local control may be achieved in tweezer arrays of Rydberg atoms and polar molecules or by using quantum gas microscopes for polar molecules and dysprosium.

Referring to FIG. 5A, by either dressing rotational states with $\Omega_0$ ($|m_1?$) or $\Omega_+$ ($|m_1,?$), both positive and negative Ising interactions may be realized. With reference to FIG. 5B, by turning on an electric field, the molecular states gain permanent dipole moments, resulting in positive interactions. Referring to FIG. 5C, by combining the application of an electric field and dressing, negative Ising interactions can be realized. In FIGS. 5B and 5C, N denotes which rotational states the molecular states are adiabatically connected to (in E).

The state-transfer procedures may be implemented using dipole-dipole interactions in a system of polar alkali-metal dimers. A negligible tunneling of molecules and a single molecule per lattice site may be assumed. Three different example schemes for realizing the desired interactions are presented. In all three, the electronic and vibrational ground states, can be described in terms of the angular momentum operator N. In the first, both positive and negative Ising interactions can be realized at the cost of involving large rotational states (N=3). In the second, only positive Ising interactions can be realized, but only N≤2 rotational states are needed. In the third, only negative Ising interactions can be realized, but only N≤1 rotational states are needed. These are shown in FIGS. 5A, 5B, and 5C, respectively.

In the first scheme, the |N=2? and |N=3? states are dressed with no electric field. In order to realize positive interactions, only $\Omega_0$ is turned on, which resonantly drives the it transitions. Although any pair of states dressed by $\Omega_0$, |N=2, M=2? |N=3, M=2? is used as an example. The corresponding dipole-dipole interaction is:

$$H_{dd} = \sum_{i \ne j} \mu_0^2 \frac{1 - 3\cos^2\theta}{r_{ij}^3} |2,2?_i|3,2?_j?3,2|_i?2,2|_j, \quad \text{(Eq. 27)}$$

where $r_{ij}$ is the distance between molecules i and j, $\theta_{ij}$ is the angle the displacement vector makes with the quantization axis, and $\mu_0$=? 3,2|$d_0$|2,2? is the corresponding transition dipole moment, where $d_p=\hat{e}_p \cdot d$ is a component of the dipole operator d and $\hat{e}_0=\hat{z}$, $\hat{e}_\pm=\mp(\hat{x}\pm i\hat{y})/\sqrt{2}$. If $|m_0$? =|0,0 ? and $|m_1$? =(|2,2? +|3,2? )/$\sqrt{2}$ is encoded, the dipole-dipole interactions in the $|m_0$? $|m_1$? basis becomes:

$$H_{int} = \sum_{i \ne j} \frac{\mu_0^2}{4} \frac{1 - 3\cos^2\theta}{r_{ij}^3} (1 - Z_i)(1 - Z_j), \quad \text{(Eqn. 28)}$$

thus realizing the desired positive Ising interactions. Note that in addition to the Ising interactions, the above Hamiltonian also has terms proportional to Z. However, this is not an issue, as upon applying the spin-echo procedure using $-cH_{int}$, these terms will disappear. Additionally, because N=2,3 is used rather than N=1,2, there are no interactions associated with $|m_0$? due to selection rules. Finally, note that for the above interactions to hold, a strong drive $\Omega_0 >> H_{dd}$ must be used.

To realize the negative interactions, only $\Omega_+$ is turned on, driving the $\sigma_+$ transitions. Considering only the states |2,2 ? |3,3? the corresponding dipole-dipole interactions take the form:

$$H'_{dd} = \sum_{i \ne j} -\frac{\mu_+^2}{2} \frac{1 - 3\cos^2\theta}{r_{ij}^3} |2,2?_i|3,3?_j?3,3|_i?2,2|_j, \quad \text{(Eqn. 29)}$$

where $\mu_0$=? 3,3|$d_+$|2,2? is the corresponding transition dipole moment. In this case, $|m_1$,? =(|2,2? +|3,3? )/$\sqrt{2}$ is encoded, leading to the resulting interaction Hamiltonian in the $|m_0$? $|m_1$,? basis:

$$H'_{int} = -\sum_{i \ne j} \frac{\mu_+^2}{8} \frac{1 - 3\cos^2\theta}{r_{ij}^3} (1 - Z_i)(1 - Z_j), \quad \text{(Eqn. 30)}$$

thus realizing the desired negative Ising interactions.

In the second scheme, an electric field may be applied. Defining $|\phi_{N,M}$? as the states which are adiabatically connected (as E is turned on) to |N, M⟩ |$m_0$⟩=|$\phi_{0,0}$⟩ and |$m_1$⟩=|$\phi_{2,2}$⟩ are encoded. Due to the electric field E, these two states gain permanent dipole moments $\mu_a$ and $\mu_b$. Additionally, because the electric field does not couple |2,2⟩ to |1, M⟩ there are no interactions between |$m_0$⟩ and |$m_1$⟩. This results in the dipole-dipole interactions:

$$H_{int} = \Sigma_{i\neq j} \frac{1-3\cos^2\theta}{4r_{ij}^3}\left[\left(\mu_a^2+\mu_b^2\right)Z_iZ_j + \left(\mu_a^2-\mu_b^2\right)(Z_i+Z_j)\right], \quad \text{(Eqn. 31)}$$

providing positive Ising interactions. Note that negative interactions cannot be achieved in this way, so another scheme must be used in combination with this approach.

In addition to an electric field E, the states |$\phi_{0,0}$⟩ and |$\phi_{1,1}$⟩ are dressed, encoding |$m_0$⟩=$\sqrt{a}$|$\phi_{0,0}$⟩+$\sqrt{1-a}$|$\phi_{1,1}$⟩ and |$m_{1'}$⟩|$\phi_{1,0}$⟩, where a is defined by Ω, Δ. For any electric field strength E, the value of a can always be tuned so that there are only negative Ising interactions. Unlike the second scheme, only negative Ising interactions can be achieved, so by combining the two schemes, one may avoid the complications associated with using high N states in the first scheme.

Thus, by transferring the |$m_1$⟩ population to the |$m_{1'}$⟩ state and changing which of the above schemes is used, it is possible to implement the state transfer method via polar molecules.

Figure 6A:
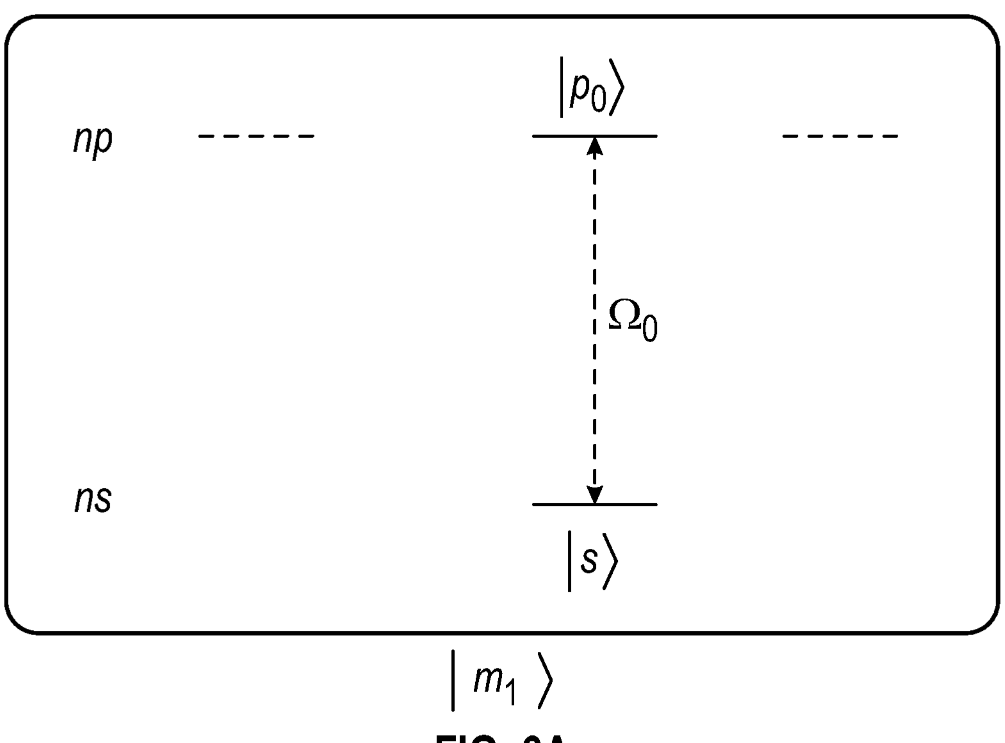
FIGS. 6A and 6B, illustrate a dressing scheme for realizing $H_{int}$ and $H_{int}'$ via microwave dressing, with $|m_1$⍰ =(|s ⍰ +$|p_0$⍰ )/√2 and $|m_1$,⍰ =(|s⍰ +$|p_+$⍰ )/√2, in accordance with examples of the present disclosure.
Figure 6B:
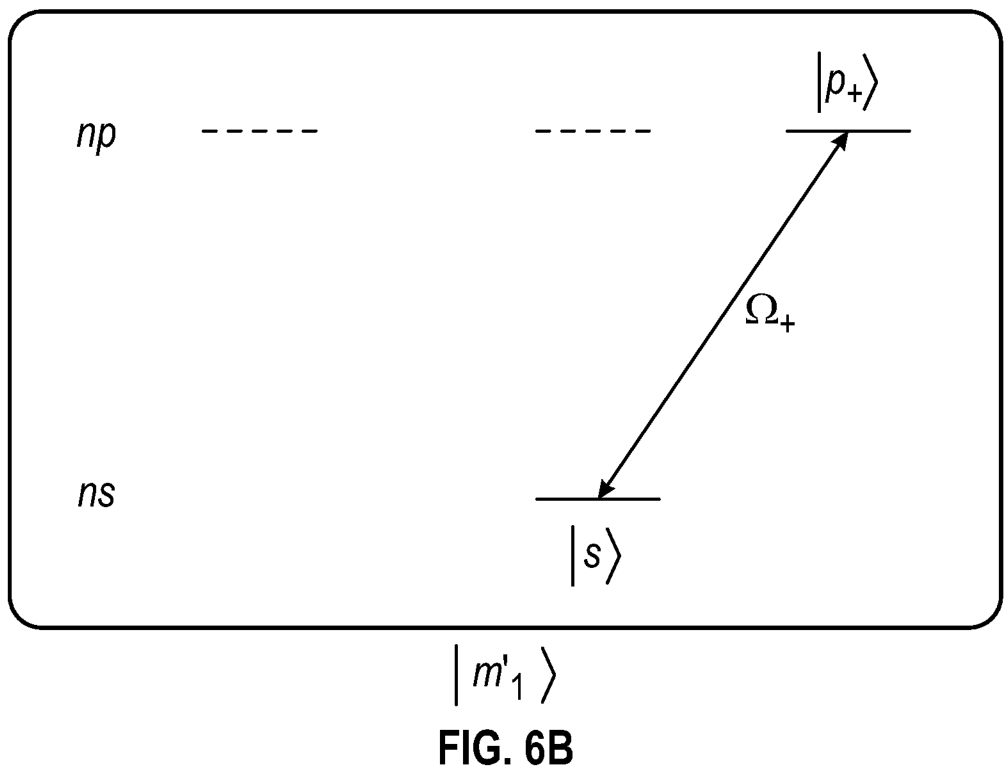

In aspects, the state transfer method may be implemented using Rydberg atoms, which will share several similarities with the disclosed implementation in polar molecules. In order to do so, |$m_0$⟩|$m_1$⟩ is encoded in linear combinations of four different states |g⟩|s⟩|$p_0$⟩ and |$p_+$⟩ corresponding to a ground state, a Rydberg s state, and two Rydberg p states. In the case of the latter two states, 0/+ correspond to the polarization of the drive needed to couple the s state to the corresponding p state. Additionally, the p states may have similar values of the principal quantum number n compared to the s state, leading to strong dipole-dipole interactions between s states and p states. These states are illustrated in FIGS. 6A and 6B. The disclosed systems and methods enable much stronger interactions, providing faster state transfer with fewer errors due to dissipation.

In order to realize $H_{int}$, the |s⟩ state may be strongly dressed with the |$p_0$⟩ state with a strong resonant microwave field. In the absence of any external fields, these two states interact according to the dipole-dipole interaction $$H_{dd} = \sum_{i\neq j} \mu_0^2 \frac{1-3\cos^2\theta}{r_{ij}^3} |s_i p_{j,0}\rangle\langle p_{i,0} s_j|_2 \quad \text{(Eqn. 32)}$$

where $r_{ij}$ is the distance between atoms i and j, $\theta_{ij}$ is the angle the displacement vector makes with the quantization axis, and $\mu_0$=⟨$p_0$|$d_0$|s⟩ is the corresponding transition dipole moment, where $d_p=\hat{e}_p\cdot d$ is a component of the dipole operator d and $\hat{e}_0=\hat{z}$, $\hat{e}_\pm=\pm(\hat{x}\pm i\hat{y})/\sqrt{2}$. Using the strong resonant microwave field, |$m_0$⟩=|g⟩ and |$m_1$⟩=(|s⟩+|$p_0$⟩)/$\sqrt{2}$ may be encoded. In the limit of a strong microwave Rabi frequency $\Omega_{mw}$>>$H_{dd}$, the dipole-dipole interactions in the |$m_0$⟩|$m_1$⟩ basis may be expressed as:

$$H_{int} = \sum_{i\neq j} \frac{\mu_0^2}{4} \frac{1-3\cos^2\theta}{r_{ij}^3}(1-Z_i)(1-Z_j). \quad \text{(Eqn. 33)}$$

In order to realize $-H_{int}$, the same approach as for $H_{int}$ may be used. However, rather than dressing the |s⟩ state with |$p_0$⟩ the |s⟩ state is resonantly dressed with |$p_+$⟩. In this case, the corresponding dipole-dipole interaction is:

$$H'_{dd} = \Sigma_{i\neq j} -\frac{\mu_+^2}{2}\frac{1-3\cos^2\theta}{r_{ij}^3}|s_i p_{j,+}\rangle\langle p_{i,+} S_j|, \quad \text{(Eqn. 34)}$$

where $\mu_+$=⟨|$d_+$|s⟩. Note that, aside from a constant factor, the dipole-dipole interaction here only differs by a sign from $H_{dd}$. As such, if |$m_{1'}$⟩=(|s⟩+|$p_+$⟩)/$\sqrt{2}$ is encoded and again the limit of a strong microwave Rabi frequency $\Omega_{mw}$>>$H_{dd}$ is taken, the resulting interactions are:

$$H'_{int} = -\sum_{i\neq j} \frac{\mu_+^2}{8}\frac{1-3\cos^2\theta}{r_{ij}^3}(1-Z_i)(1-Z_j), \quad \text{(Eqn. 35)}$$

which differs from $H_{int}$ by a negative constant. Thus, by transferring the |$m_1$⟩ population to the |$m_{1'}$⟩ state and changing the polarization of the microwave field, it is possible to implement the state transfer methods via Rydberg atoms. Note that when the polarization of the drive is changed, one must ensure that the qubit state is temporarily not encoded in |s⟩|$p_0$⟩|$p_+$⟩.

Using similar principles to the above, it is also possible to realize the desired control-target interactions without the spin-echo approach. This is achieved by turning on both drives $\Omega_{0/+}$ with detunings $\Delta_{0/+}$ and using different principal quantum numbers n for |$p_{0/+}$⟩. With a proper choice of parameters, two of the resulting dressed states |c⟩|t⟩ interact with each other but not themselves. Thus, by forming the control qubits with |c⟩ and the target qubits with |t⟩ the desired pure control-target interactions can be realized, although a spin-echo sequence must be applied to all qubits to eliminate an effective longitudinal field. The details of engineering this form of interactions can be generalized to polar molecules and magnetic atoms as well.

FIGS. 6A and 6B, illustrate a dressing scheme for realizing (FIG. 6A) $H_{int}$ and (FIG. 6B) $H_{int}'$ via microwave dressing, with |$m_1$⟩=(|s⟩+|$p_0$⟩)/$\sqrt{2}$ and |$m_{1'}$⟩=(|s⟩+|$p_+$⟩/$\sqrt{2}$. In each case, $\Omega_{0}$+>>$H_{dd}$ may be used so that the microwave-dressed basis may be used.

In aspects, 1/$r^6$ vdW interactions may be used for state transfer in 3D. While this will not be as fast as using 1/$r^3$ dipole-dipole interactions, it provides the benefit of being less complicated since the vdW interactions will have no significant angular dependence and there will be no microwave drive necessary. Moreover, it provides a natural means of experimentally demonstrating that vdW interactions are long-range in three dimensions.

One option to realize the desired sign change in the vdW interactions is by inducing a Förster resonance for a s state via an external magnetic field. Provided one keeps the atoms sufficiently far apart outside of the dipole-dipole interaction regime, where the interaction causes pairs of s states hybridize with pairs of p states, the sign of $C_6$ will be opposite on either side of the Förster resonance.

Alternatively, there is another approach which does not require the use of external fields. Here, |$m_0$⟩=|g⟩|$m_1$⟩=|s⟩ and |$m_{0'}$⟩=|s'⟩ are encoded, where |s⟩|s'⟩ are two different Rydberg s states. The Rydberg interactions will generally have the form:

$$H_{vdW} = -\sum_{i \neq j} \frac{1}{r_{ij}^6}\left[C_6|s_i s_j\rangle\langle s_i s_j| + C_{6'}\left|s'_i s'_j\rangle\langle s'_i s'_j\right| + C_6^c(|s'_i s_j\rangle\langle s'_i s_j| + H.c.)\right], \quad \text{(Eqn. 36)}$$

where $$C_6, C_{6'}, C_6^c$$

denote the vdW interaction coefficients for the s interaction, the s' interactions, and the cross interaction between s and s'.

The resulting interactions for $|m_0\rangle|m_1\rangle$ takes the form:

$$H_{int} = -\frac{1}{4}\sum_{i \neq j} \frac{C_6}{r_{ij}^6}(1 - Z_i)(1 - Z_j), \quad \text{(Eqn. 37)}$$

naturally realizing the desired Ising interactions. In contrast, the resulting interactions for $|m_0,\rangle|m_1\rangle$ are:

$$H'_{int} = -\frac{1}{4}\sum_{i \neq j} \frac{C_6}{r_{ij}^6}(1 - Z_i)(1 - Z_j) + \frac{C_{6'}}{r_{ij}^6}(1 + Z_i)(1 + Z_j) + \frac{C_6^c}{r_{ij}^6}(1 - Z_i)(1 + Z_j) + \frac{C_6^c}{r_{ij}^6}(1 + Z_i)(1 - Z_j). \quad \text{(Eqn. 38)}$$

In this case, the resulting Ising interactions have strength $$-\left(C_6/4 + C_{6'}/4 - C_6^c/2\right)r^6.$$

Thus, in order to ensure that $H'_{int}$ differs by a negative sign from $H_{int}$, then $$C_6 + C_{6'} - 2C_6^c < 0,$$

which is achievable for reasonable choices of Rydberg states. One minor complication arises via the fact that the coefficients of the Z terms relative to the Ising interactions are not the same for each Hamiltonian. However, this is easily remedied by applying an X gate to all atoms at once as in the usual spin-echo procedure. Since it is applied to all atoms, it will not affect the Ising interactions themselves, but it will reverse the evolution due to the Z terms, allowing one to ensure that their contribution is 0 at the end of the evolution.

Figure 7:
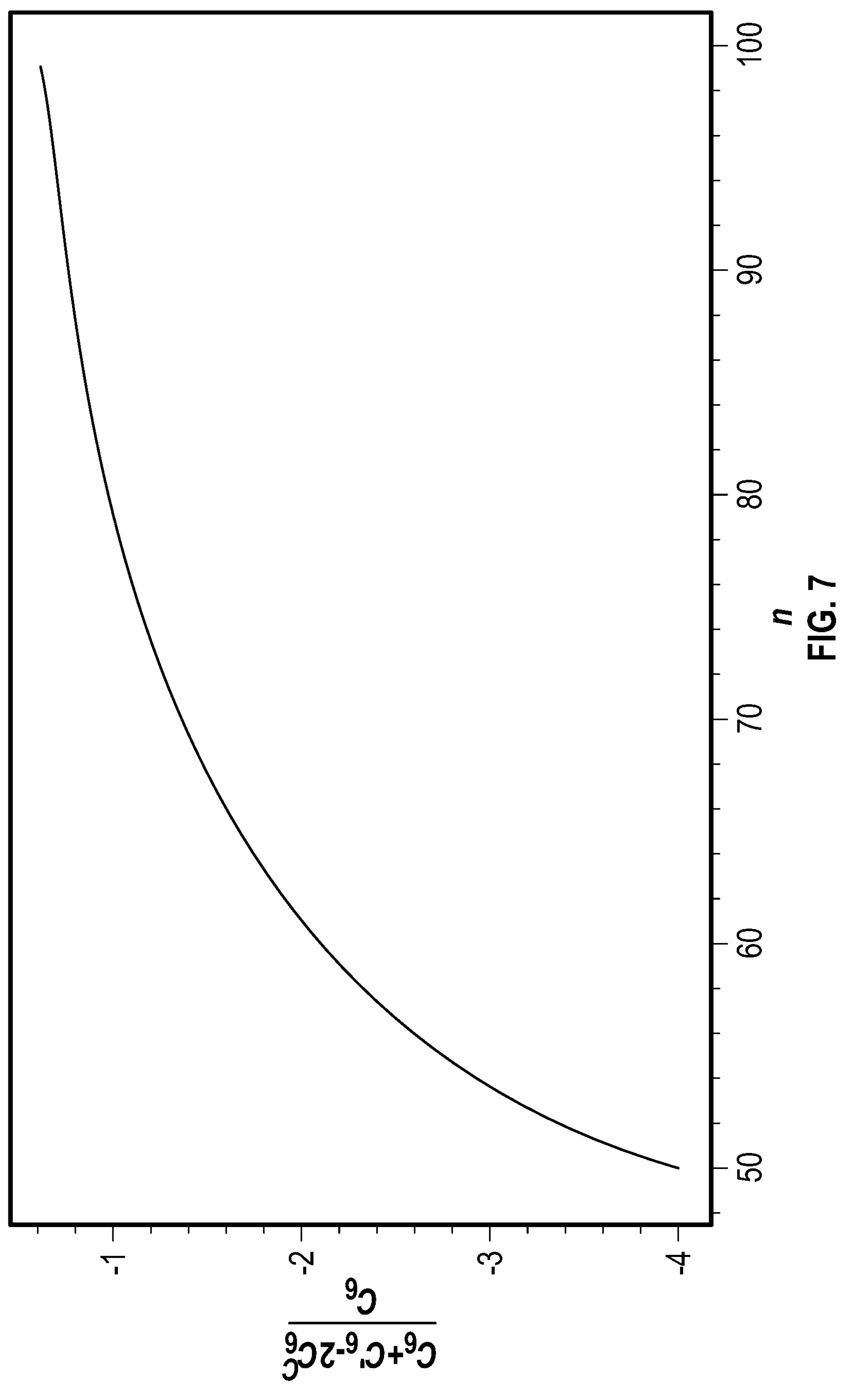
FIG. 7 is a diagram illustrating the effective van der Walls (vdW) interactions between controls and targets for negative Ising interactions, in accordance with examples of the present disclosure.
Figure 8:
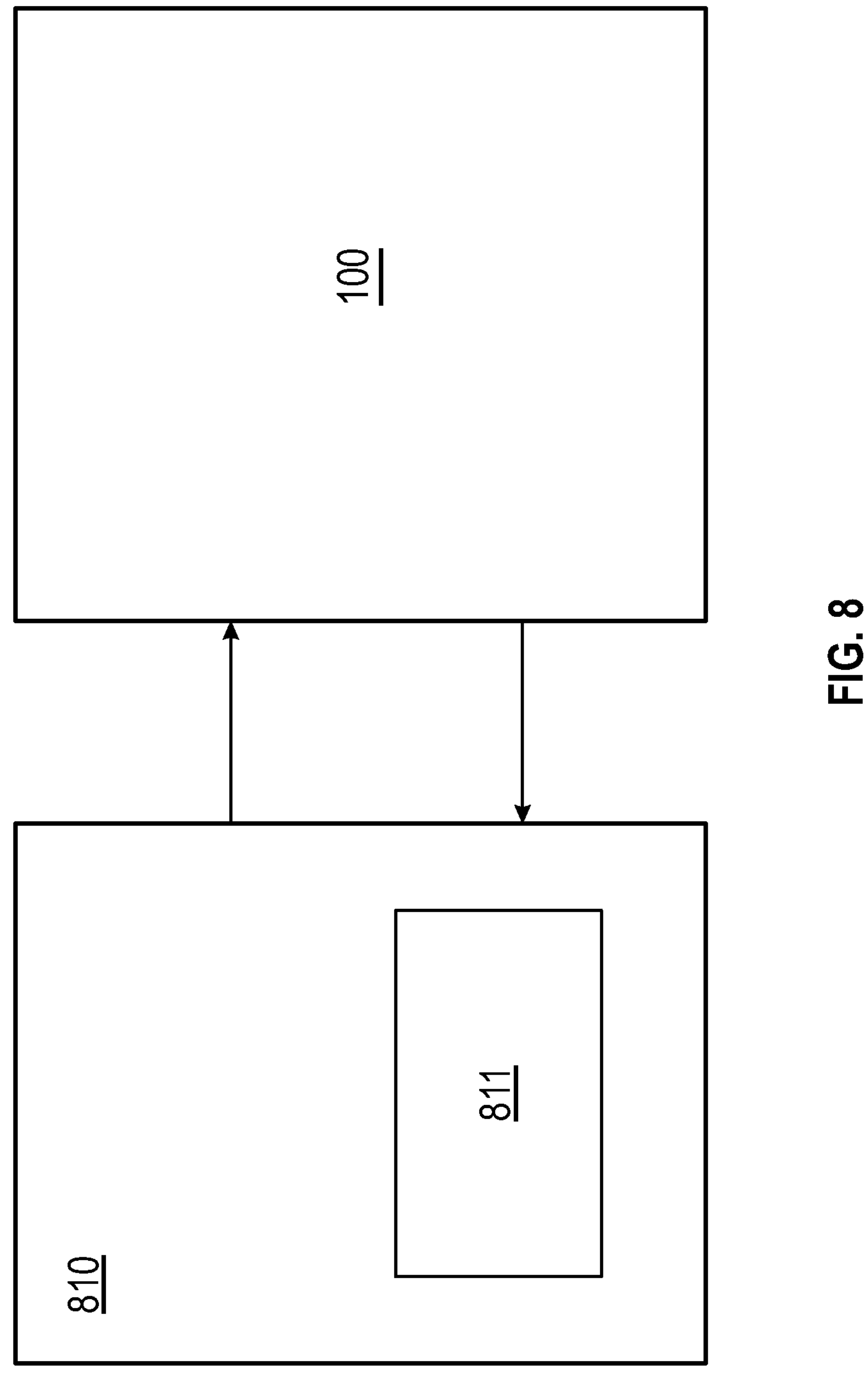
FIG. 8 is a schematic diagram of an exemplary processing system diagram for use with the system of FIG. 1, in accordance with examples of the present disclosure.

FIG. 7 illustrates the effective van der Walls (vdW) interactions between controls and targets for negative Ising interactions, normalized to the case of positive interactions. The Rydberg states used are n and n'=n−1.

In aspects, the state transfer method may be implemented in a two-dimensional lattice of ultracold dysprosium atoms, in particular, bosonic isotopes of dysprosium (such as $^{162}Dy$, $^{164}Dy$). The nuclear spin may be ignored. The computation states $m_0$, $m_1$ in the Zeeman manifold of the electronic ground state of the dysprosium may be encoded. The interactions between a pair of dysprosium atoms i, j are given by magnetic dipole-dipole interactions (in units of $\mu_0(g_J\mu_B)^2/4\pi$):

$$H_{ij} = \frac{1}{r_{ij}^3}\left(1 - 3\cos^2(\theta)\right)\left[J_i^z J_j^z - \frac{1}{4}\left(J_i^+ J_j^- + J_i^- J_j^+\right)\right] - \frac{3}{4}\sin^2(\theta)\left[e^{-2i\phi}J_i^+ J_j^+ + H.c\right]. \quad \text{(Eqn. 38)}$$

Here, J=8 is the electronic angular momentum of the ground state, and θ, ϕ are the polar and azimuthal angles with respect to the quantization axis (which is set by a magnetic field which also breaks the degeneracy of the Zeeman levels M, −8≤M≤8).

The simplest way of realizing the diagonal interactions that are used is to make use of the $$J_i^z J_j^z$$

term in Eqn. 38. For instance, the choice $m_0=-8$, $m_1=8$ yields the interaction $$H_{int} = \Sigma_{ij} 16\frac{1 - 3\cos^2\theta_{ij}}{r_{ij}^3} Z_i Z_j,$$

up to potential longitudinal terms ($Z_i$, $Z_j$) depending on the energies of the two states $m_0$, $m_1$.

In order to realize the reverse Hamiltonian, i.e., the same Hamiltonian but with opposite sign, the flip-flop interactions in Eqn. 38 may be used. Using microwave and optical dressing, for example, the following dressed states may be selected: $m_0=(4+-4)/\sqrt{2}$, and $m_1=a8+b7+c-8$, where the a, b, c amplitudes are tunable via the dressing parameters. This choice yields $m_0 J_z m_0=0$ and by properly tuning a, b, c that $m_1 J_z m_1=0$. In this case, only the flip-flip interactions from Eqn. 38 contribute, and in fact, the only nonzero matrix element is $m_1 m_1 H_{ij} m_1 m_1$, thus realizing the same $Z_i Z_j$ interactions, as before, but with the opposite sign. In general, this would also give rise to longitudinal terms that depend on both the interactions strength and the energy splitting of the states. These can be dealt with the spin echo procedure as explained previously.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different example embodiments provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system of quantum state transfer and entanglement generation, the system comprising:
- a quantum system including a plurality of qubits;
- a processor; and
- a memory, including instructions stored thereon, which, when executed by the processor, cause the quantum system to:
- access a signal of the quantum system;
- encode unknown coefficients in one qubit of the plurality of qubits;
- initialize each of the remaining qubits of the plurality of qubits in state $|0\rangle$;
- group the plurality of qubits into a plurality of subsystems;
- in each of the plurality of subsystems which includes two or more qubits: encode quantum information into Greenberger-Horne-Zeilinger-like (GHZ-like) states using nearest-neighbor interactions; and
- apply a generalized controlled-phase gate between the plurality of subsystems to merge the GHZ-like states into an entangled state between the plurality of subsystems, wherein the merging is performed by applying a time-dependent power-law interacting Hamiltonian that generates the generalized controlled-phase gate between the plurality of subsystems.

2. The system of claim 1, wherein the instructions, when executed by the processor, further cause the quantum system to rotate the entangled state into a desired GHZ-like state by concentrating an entanglement in each subsystem of the plurality of subsystems onto one qubit $c_j$ of each of the plurality of subsystems, wherein $_j$ is an index number.

3. The system of claim 2, wherein the instructions, when executed by the processor, further cause the quantum system to apply a single-qubit rotation to $c_j$.

4. The system of claim 3, wherein the instructions, when executed by the processor, further cause the quantum system to redistribute the entanglement to the plurality of subsystems as a resulting GHZ-like state.

5. The system of claim 4, wherein the instructions, when executed by the processor, further cause the quantum system to repeatedly feed the resulting GHZ-like state back into applying a generalized controlled-phase gate between the plurality of subsystems to merge the GHZ-like states into an entangled state between the plurality of subsystems to yield larger GHZ-like states.

6. The system of claim 3, wherein the system further includes a Hadamard gate, and wherein the rotation of $c_j$ is applied using the Hadamard gate.

7. The system of claim 1, wherein the subsystems include hypercubes,
- wherein interactions between the plurality of subsystems are selected such that a total phase accumulated by $c_j$ reaches, wherein $_j$ is an index number.

8. The system of claim 1, wherein the unknown coefficients include a, b.

9. The system of claim 8, wherein the unknown coefficients of the one qubit of the plurality of qubits is encoded as $a|0\rangle+b|1\rangle$..

10. The system of claim 1, wherein the quantum system includes a power-law interacting Hamiltonian.

11. A method of quantum state transfer and entanglement generation, the method comprising:
- accessing a signal of a quantum system, the quantum system includes a plurality of qubits;
- encoding unknown coefficients in one qubit of the plurality of qubits;
- initializing each of the remaining qubits of the plurality of qubits in state $|0\rangle$;;
- grouping the plurality of qubits into a plurality of subsystems;
- in each of the plurality of subsystems which includes two or more qubits: encoding quantum information into Greenberger-Horne-Zeilinger-like (GHZ-like) states using nearest-neighbor interactions; and
- applying a generalized controlled-phase gate between the plurality of subsystems to merge the GHZ-like states into an entangled state between the plurality of subsystems, wherein the merging is performed by applying a time-dependent power-law interacting Hamiltonian that generates the generalized controlled-phase gate between the plurality of subsystems.

12. The method of claim 11, further comprising rotating the entangled state into a desired GHZ-like state by concentrating an entanglement in each subsystem of the plurality of subsystems onto one qubit $c_j$ of each of the plurality of subsystems, wherein $_j$ is an index number.

13. The method of claim 12, further comprising applying a single-qubit rotation to $c_j$.

14. The method of claim 13, further comprising redistributing the entanglement to the plurality of subsystems as a resulting GHZ-like state.

15. The method of claim 14, further comprising repeatedly feeding the resulting GHZ-like state back into applying a generalized controlled-phase gate between the plurality of subsystems to merge the GHZ-like states into an entangled state between the plurality of subsystems to yield larger GHZ-like states.

16. The method of claim 11, wherein the subsystems include hypercubes.

17. The method of claim 11, wherein the unknown coefficients include a, b.

18. The method of claim 17, wherein the unknown coefficients of the one qubit of the plurality of qubits is encoded as a $|0\rangle+b|1\rangle$..

19. The method of claim 11, wherein the rotation of $c_j$ is applied using a Hadamard gate.

20. A method of quantum state transfer and entanglement generation, the method comprising:
- accessing a signal of a quantum system, the quantum system includes a plurality of qubits;
- encoding $a|0\rangle+b|1\rangle$ in one qubit of the plurality of qubits;
- initializing each of the remaining qubits of the plurality of qubits in state $|0\rangle$;;

grouping the plurality of qubits into a plurality of hypercubes;

in each of the hypercubes of the plurality of hypercubes which includes two or more qubits: encoding quantum information into Greenberger-Horne-Zeilinger-like (GHZ-like) states;

merging the GHZ-like states into an entangled state between the plurality of hypercubes, wherein the merging is performed by applying a time-dependent power-law interacting Hamiltonian that generates a generalized controlled-phase gate between the plurality of subsystems;

rotating the entangled state into a desired GHZ-like state;

applying a single-qubit rotation to one bit of one of the plurality of hypercubes; and redistributing the entanglement to the plurality of hypercubes.

* * * * *